United States Patent [19]

Loizzi

[11] Patent Number: 4,975,292
[45] Date of Patent: Dec. 4, 1990

[54] FLAVORED INSERTS FOR COFFEE FILTERS OR THE LIKE

[76] Inventor: Carl J. Loizzi, 13456 Pala Ave., Sylmar, Calif. 91342

[21] Appl. No.: 395,136

[22] Filed: Aug. 16, 1989

Related U.S. Application Data

[62] Division of Ser. No. 302,450, Jan. 26, 1989, abandoned.

[51] Int. Cl.⁵ ............................ A23L 1/22; A23L 2/38
[52] U.S. Cl. ......................................... 426/77; 426/78; 426/132; 426/433; 426/420
[58] Field of Search .................................. 426/77–84, 426/112, 132, 433, 435; 99/295, 304, 306

[56] References Cited

U.S. PATENT DOCUMENTS

| | | | |
|---|---|---|---|
| 2,047,134 | 7/1936 | Coleman | 99/306 |
| 2,061,119 | 11/1936 | Voigt | 99/306 |
| 2,105,690 | 1/1938 | Greenblatt | 426/87 |
| 2,835,587 | 5/1958 | Maggiore | 426/78 |
| 2,926,088 | 2/1960 | Spiselman | 426/433 |
| 3,006,764 | 10/1961 | Stephenson et al. | 426/78 |
| 3,689,291 | 9/1972 | Draper | 426/78 |
| 4,186,215 | 1/1980 | Buchel | 426/86 |
| 4,612,942 | 9/1986 | Dobberstein et al. | 426/78 |
| 4,619,766 | 10/1986 | Smiley et al. | 210/482 |

FOREIGN PATENT DOCUMENTS

| | | | |
|---|---|---|---|
| 766309 | 10/1971 | Belgium | 426/78 |
| 717936 | 9/1965 | Canada | 426/78 |
| 1363533 | 6/1963 | France | 426/78 |
| 888351 | 1/1962 | United Kingdom | 426/78 |
| 2074532 | 11/1981 | United Kingdom | 426/78 |

OTHER PUBLICATIONS

Chem Abstracts vol. 107, 1987 107:6045t, "Flavoring Agents for Tea Bags".

*Primary Examiner*—Steven Weinstein
*Attorney, Agent, or Firm*—Poms, Smith, Lande & Rose

[57] ABSTRACT

Flavored inserts which can be impregnated with a desired flavor and placed inside of a conventional coffee filter. The insert permits the brewing water to filter through the filter without obstruction while imparting the desired flavor to the brewing water.

9 Claims, 2 Drawing Sheets

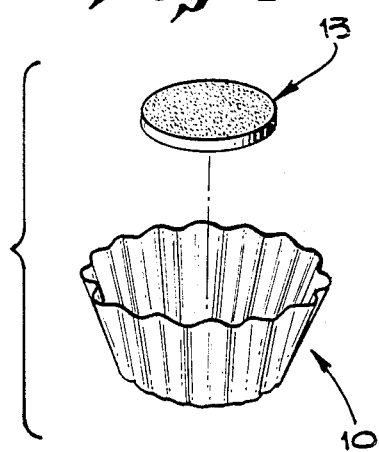
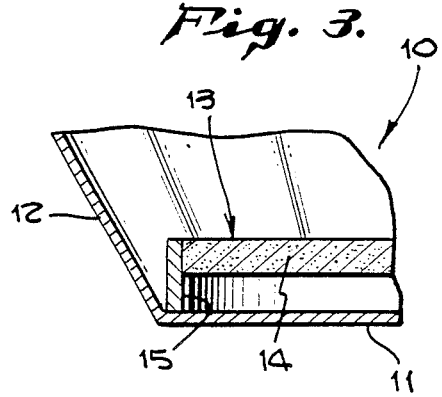
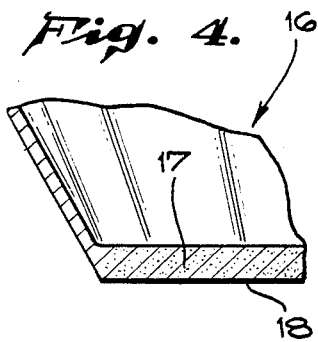
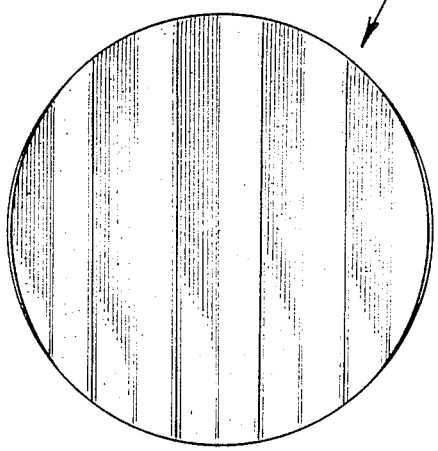
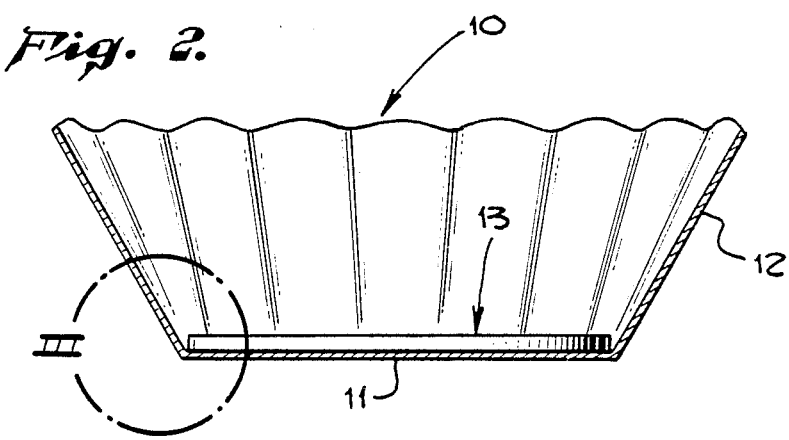

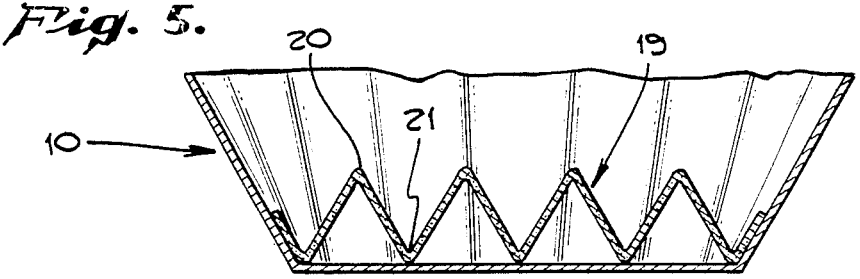
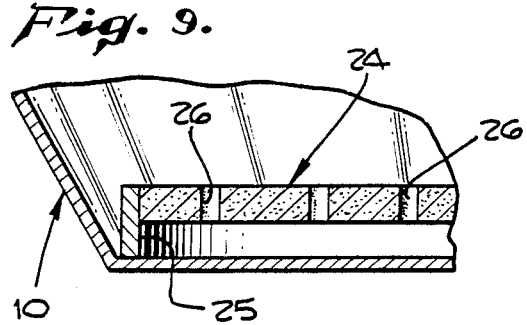
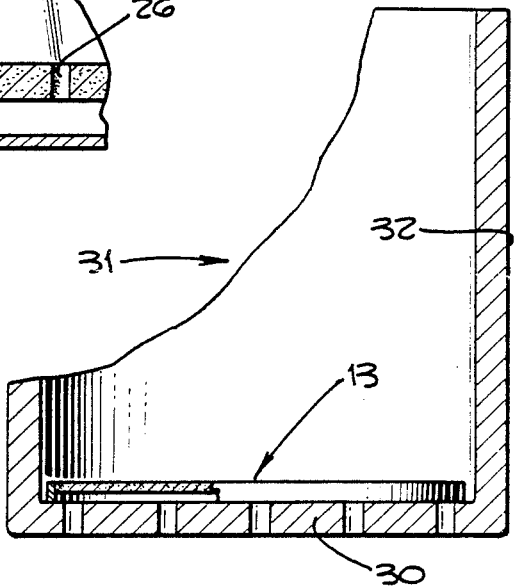
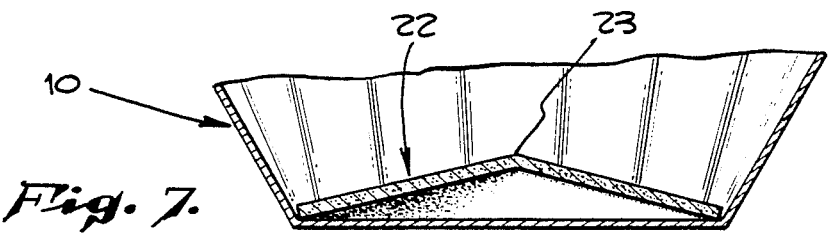

FLAVORED INSERTS FOR COFFEE FILTERS OR THE LIKE

This is a divisional of co-pending application Ser. No. 07/302,450 filed on Jan. 26, 1989, now abandoned.

Background of the Invention

1. Field of the Invention

The invention relates to flavored coffee devices; and, more particularly, to inserts for conventional coffee filters for imparting a desired flavor to the coffee during the brewing process.

2. Description of the Prior Art

The consumption of coffee continues to be high all over the world. In the U.S., the consumption of coffee during the years from 1980 through 1985 averaged over 10 pounds of coffee beans per person per year or an average of about 26½ gallons each person per year. Thus, coffee remains an essential beverage in most households regardless of the concern to cut back on caffeine consumption. A recent development has been the increased use of flavored gourmet coffees. These coffees are generally in powdered form and flavored, as with chocolate, mocha, etc. Some flavored coffees are provided in a coffee bean form having flavoring agents, as, for example, vanilla beans, mixed in with the coffee beans to impart a desired flavor. Needless to say, both types of coffees are quite expensive, the powder not having the advantage of freshly brewed coffee and the beans requiring grinding before brewing.

There is a need for a means to provide coffee of varying flavors without the need for expensive powders or coffee beans.

Such means should be easy to use and low cost flavoring means useful in coffee filters of varying sizes for imparting a preselected flavor to the coffee being brewed.

SUMMARY OF THE INVENTION

It is an object of this invention to provide flavored inserts for imparting a preselected flavor to brewed coffee.

It is a further object of this invention to provide a flavored filter for imparting a preselected flavor to brewed coffee.

It is still further an object of this invention to provide means for imparting preselected flavors to various types of beverages.

These and other objects are preferably accomplished by providing flavored inserts which can be impregnated with a desired flavor and placed inside of a conventional coffee filter. The insert permits the brewing water to filter through the filter without obstruction while imparting the desired flavor to the brewing water. The entire filter can be so flavored, or at least the bottom thereof, and the flavored insert and/or flavored filter can be used to impart flavoring to various beverages, such as tea, soft drinks, etc.

BRIEF DESCRIPTION OF THE DRAWING

FIG. 1 is an exploded view of a conventional coffee filter showing a flavored insert in accordance with the invention to be mounted therein;

FIG. 2 is a vertical view, partly in sectional, of the assembled filter of FIG. 1;

FIG. 3 is detailed sectional view of the filter assembly of FIG. 2 as indicated by lines III;

FIG. 4 is a view similar to FIG. 3 showing another embodiment of the invention wherein the coffee filter itself has a flavored portion built in;

FIG. 5 is a vertical sectional view of another embodiment of the insert of FIG. 1;

FIG. 6 is a top plan view of the insert of FIG. 5;

FIG. 7 is a vertical sectional view of still another embodiment of the insert of FIG. 1;

FIG. 8 is a top plan view of the insert of FIG. 7;

FIG. 9 is a view similar to FIG. 3 showing a further embodiment of the insert of FIG. 1; and FIG. 10 is a vertical sectional view of still another embodiment of the invention.

DESCRIPTION OF THE PREFERRED EMBODIMENT

Referring now to FIGS. 1 and 2 of the drawings, a conventional pleated paper coffee filter 10 is shown having a generally round bottom wall 11 (FIG. 2) and an upwardly and outwardly flared peripheral wall 12. Filter 10 in the embodiment of FIGS. 1 and 2 is conventional and forms no particular part of the invention. However, as seen, and as particularly contemplated in the present invention, an insert 13 is provided being preferably generally round and of a diameter generally related to the diameter of bottom wall 11 of filter 10. For example, if the bottom wall 11 of filter 10 is about 4" in diameter, which is a conventional filter size, the diameter of insert 13 may be also about 4". Of course, as will be discussed, insert 13 may be provided in various size diameters to be insertible in filters of varying sizes. Also, although filter 10 is a paper filter, permanent-type filters of a sturdy material, which are reusable and which may or may not have a removable non-reusable interior filter, can be used with insert 13.

As particularly seen in FIG. 3, insert 13 preferably has a main body portion 14 and a peripheral downwardly depending support skirt 15. Skirt 15 may be of a suitable semi-rigid material, such as stiff paper, and supports main body portion 14 on the upper surface of the bottom wall 11 of filter 10 and spaced therefrom. Body portion 14 may be any suitable paper filter material which has been pre-treated with the desired flavor. This may be accomplished by various methods, such as by steeping a conventional fibrous paper filter material in a flavoring in liquid form, then allowing the filter material to dry.

In use, insert 13 is placed inside of filter 10 as seen in FIGS. 2 and 3 and ground coffee is placed on top. The filter 10, with flavored insert 13 in place, is placed in a conventional coffee filter holder (not shown) and the coffee is brewed in a conventional manner. That is, boiling or near boiling water within filter 10 contacts both the coffee grounds therein and the flavored insert, passes skirt 15 down into the interior of the brewing vessel. The flavoring agent embedded in insert 13 is leached therefrom and passes into the brewing vessel along with the brewed coffee. Thus, a flavored coffee is provided in a quick, easily and inexpensive manner and insert 13 is disposed of along with filter 10 after use.

Of course, the brewing material could be tea leaves or the like and insert 13 may- be embedded with a flavoring agent suitable to flavor teas, e.g., orange flavoring for tea, etc. Also, any boiling water can be poured through filter 10 into contact with insert 13 to impart a flavor to the water (e.g., lime or lemon).

Although a separate insert is preferred allowing such flavored inserts to be used in various types and sizes of filters, a conventional filter, such as filter 16 in FIG. 4 may be provided otherwise identical to filter 10 in FIG. 1 but having a flavoring agent 17 embedded in at least the bottom wall 18 in the same manner as discussed hereinabove with respect to insert 13.

Insert 13 is disclosed in FIGS. 1 through 3 as being generally planar with a downwardly depending skirt. Skirt 15 can of course be omitted, if desired, and the filter insert can take various configurations. For example, as seen in FIGS. 5 and 6, insert 19 (shown in filter 10 of FIGS. 1-3) can be round and pleated as shown forming peaks 20 and valleys 21. Any suitable shape retaining paper filter material may be used. Insert 19 is also permeated or otherwise treated with a flavoring agent as heretofore discussed and used in the same manner as insert 13.

As seen in FIGS. 7 and 8, a conically shaped insert 22 (also shown in filter 10 of FIGS. 1-3) may be provided being round, as seen in FIG. 8, and peaked or domed at apex 23. Again, insert 22 is treated with a flavoring agent and used in the same manner as insert 13.

As seen in FIG. 9, a perforated insert 24 (again shown disposed in filter 10 of FIGS. 1-3) may be provided being round in the manner of insert 13 with a peripheral downwardly extending skirt 25 and a plurality of spaced throughholes or perforations 26. The material of filter insert 24 is of course porous so as to allow hot liquid to pass therethrough but perforations 26 allow greater seepage. Insert 24 is of course treated with a flavoring agent and used as heretofore discussed with respect to insert 13.

In still another embodiment of the invention, as seen in FIG. 10, insert 13 of FIG. 1 can be placed on the bottom wall 30 of a permanent type filter 31 having a generally solid cylindrical wall 32 with bottom wall 30 being a permanent screen-type or perforated filter of a wire or plastic material.

Obviously, various types of flavors associated with coffee and tea or the like may be used, such as the following:

Chocolate
Chocolate Mint
Cinnamon
Cinnamon Almond
Grand Mariner
Kahlua
Sambuca
Vanilla Bean
Orange Leaf
Peppermint Stick
Amaretto
Almond Nut
Macadamia Nut
Creme de Menthe
Pistachio
Irish Creme
Brandy
Anisette Although the terms "flavors" and "flavoring" have been used, obviously other kinds of additives may be used, such as vitamins, medicines, sweetness, non-dairy creamer, etc. However, the invention is particularly adapted for use with conventional paper coffee filters used in drip coffee makers which are flavored with soluble flavorings for imparting a preselected flavor or flavors to the brewed coffee. The various inserts disclosed herein are sufficiently porous to allow coffee or tea grounds to rest on top or surround the insert yet allow the hot brewing water to pass therethrough while releasing the desired amount of flavor to the brewed coffee or tea.

As herein discussed, any known saturation techniques may be used to provide flavor to the inserts. For example, an absorption process can be used to allow the fibers in the conventional filter paper used to make the inserts to become saturated with the desired flavor or additive without affecting the leaching time of the filter material used. The filter paper is then dried through any suitable drying process, such as air drying. When the dried insert is contacted by the hot brewing water or other brewing liquid, the flavor or additive in the insert is dispersed from the insert and through the conventional filter and into the brewed liquid. Thus, the various inserts allow the flavor to mix with the brewing water before contact with the conventional filter and, thus, there is no interruption of the filtering process. Although skirts 15 and 25 may merely be part of the rest of the material comprising the insert, it may be any pliable, non-toxic and non-water soluble material, such as plastic, to retain its shape and insure proper dispersion of the flavor or additive.

It can be seen that I have disclosed a flavored insert particularly suited for use with conventional coffee filters for imparting a preselected flavor to brewed coffee. Although I have disclosed particular embodiments of the invention, variations thereof may occur to an artisan and the invention is intended to be limited only by the appended claims.

I claim:

1. A porous fibrous insert for use with a conventional filter having sidewalls and a flat bottom used in drip brewing a liquid comprising:

a shape retaining member comprising a porous fibrous filter material having a preselected beverage flavoring additive dispersed throughout the member, said additive being in a dried state and soluble in the presence of hot liquid;

said insert being substantially thin and coextensive with said flat bottom of said filter, said member having an upper surface with a lower surface; and means for preventing the lower surface of said member from being flush with said flat bottom of said filter when said insert is placed in and supported on said flat bottom of said filter such that said lower surface is spaced from said flat bottom.

2. In the insert of claim 1 wherein said member is round and planar.

3. In the insert of claim 1 wherein said means comprises a downwardly depending peripheral support skirt extending from said member.

4. In the insert of claim 1 wherein said member is round and planar and wherein said means comprises a downwardly depending peripheral support skirt extending from said member, the lower edge of said skirt being spaced from said lower surface.

5. In the insert of claim 1 wherein said member has a plurality of spaced perforations therethrough greater in diameter than the porous openings in said member.

6. In the insert of claim 5 wherein said means comprises a downwardly depending peripheral skirt, the lowermost edge of said skirt being spaced from said lower surface.

7. In the insert of claim 6 wherein said member is round on the outer periphery thereof.

8. A filtering system for brewing coffee and simultaneously imparting a preselected flavor thereto comprising:
 a filter having a bottom planar wall of a porous fibrous material and an interconnected outwardly flared side wall of a porous fibrous material; and
 said porous fibrous insert as recited in claim 1; wherein said insert is supported on said bottom planar wall with said lower surface spaced from said bottom planar wall.

9. In the system of claim 8 wherein said means comprises a downwardly extending peripheral skirt spacing said lower surface from contact with said filter bottom planar wall.

* * * * *

UNITED STATES PATENT AND TRADEMARK OFFICE
CERTIFICATE OF CORRECTION

PATENT NO. : 4,975,292
DATED : December 4, 1990
INVENTOR(S) : Carl J. Loizzi

It is certified that error appears in the above-identified patent and that said Letters Patent is hereby corrected as shown below:

In Claim 1, Column 4, Line 38, "flavoring" should not appear.

In Claim 8, Column 5, Line 1, "coffee" should read -- a beverage --.

In Claim 8, Column 5, Line 2, "flavor" should read -- beverage additive --.

Signed and Sealed this

Twenty-sixth Day of May, 1992

Attest:

DOUGLAS B. COMER

Attesting Officer

Acting Commissioner of Patents and Trademarks